L. C. BOUMA.
SANITARY NEST EGG.
APPLICATION FILED SEPT. 5, 1919.

1,339,543.                                  Patented May 11, 1920.

INVENTOR.
L. C. BOUMA.
BY Earl M. Sinclair
ATTORNEY.

UNITED STATES PATENT OFFICE.

LOUIS CLIFFORD BOUMA, OF LYNNVILLE, IOWA.

SANITARY NEST-EGG.

1,339,543.       Specification of Letters Patent.       Patented May 11, 1920.

Application filed September 5, 1919. Serial No. 321,880.

*To all whom it may concern:*

Be it known that I, LOUIS C. BOUMA, a citizen of the United States of America, and resident of Lynnville, Jasper county, Iowa, have invented a new and useful Sanitary Nest-Egg, of which the following is a specification.

The object of this invention is to provide improved means for ridding poultry nests of lice and mites.

A further object of this invention is to provide improved means for destroying vermin on fowls through contact with a nest egg having sanitary properties.

A further object of this invention is to provide an improved construction for a nest egg formed with an internal cavity, means for filling said cavity with liquid disinfectant, and means for conveying said disinfectant slowly and gradually to the surface of the egg for the purpose of destroying vermin in a nest in which the egg may be placed and also on bodies of fowls occupying said nest.

My invention consists in the construction, arrangement and combination of elements hereinafter set forth, pointed out in my claims and illustrated by the accompanying drawing, in which—

Figure 1:
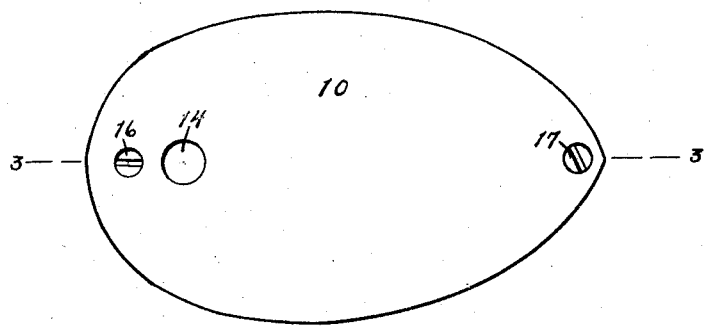
Figure 2:
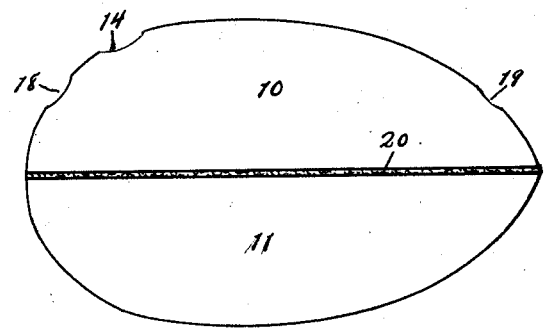
Figure 3:
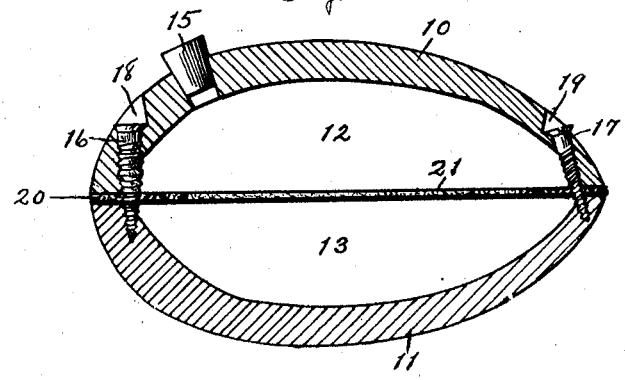

Figures 1 and 2 are elevations of my improved sanitary nest egg, taken at right angles to each other. Fig. 3 is a longitudinal section taken on the line 3—3 of Fig. 1, the stopper being shown in place.

In the construction of the device as shown the numerals 10, 11 designate two mating members, preferably formed of wood, which are of such shape, size and conformation that when placed together in assembled position they simulate in appearance a hen's or other egg. The members 10, 11 are formed with internal cavities 12, 13 respectively of any desired size and shape, preferably of relatively large capacity. One of the members 10, 11 is formed with a filling aperture 14 opening to the internal cavity, which aperture is adapted to be closed by means of a cork or other suitable stopper 15. The mating members 10, 11 are adapted to be secured together in any suitable manner as by screws 16, 17, the heads of which preferably are countersunk in one of the members in recesses 18, 19. A wick or conveyer of gasket form, designated by the numeral 20, is provided, and is adapted to be mounted between the members 10, 11 and held in place by compression therebetween or by passage of the screws 16, 17 therethrough. The wick 20 may be formed of fiber, leather or other suitable porous or semi-porous material, and its outer surface or margin preferably is flush with the outer surface of the members 10, 11, while the interior of said wick is cut away to form a relatively large opening 21, so that the cavities between the members 10, 11 are not separated.

In use a quantity of liquid germicide or disinfectant of any suitable nature is placed in the device by removing the stopper 15, after which the stopper is replaced and the article is used as a nest egg, being placed in a nest to be occupied by setting or laying fowls. Quantities of the disinfectant will seep or be conveyed through the wick member 20 and between the members 10, 11, to a degree determined by the viscosity of such disinfectant and the porosity of the wick and degree of compression thereof between the members 10, 11. The article will also become impregnated by the liquid in time, and the liquid contacts with the bottom and walls of the nest, the nest material, contents of the nest, and bodies and feathers of fowls occupying the same, and tends to kill, destroy and drive away mites, lice or other vermin with which the premises and fowls are so apt to be infested. The article thus serves not only as an attraction to the fowls, inducing them to occupy the nest, but also serves to rid the nests and fowls of the vermin and keep them in sanitary condition.

The device may be made of any size to simulate the eggs of any fowls, and may be easily and quickly and cheaply made by turning from wood.

I have shown the device divided on the line of its greatest longitudinal dimension, whereby the wick member is of maximum extent on the surface of the finished article, but it is to be understood that this arrangement may be varied at will, and I do not desire to be understood as limited in this respect.

As the internal cavity is of considerable size, a filling with disinfectant should last a considerable time, so that little attention is required after the article is once ready for use.

I claim as my invention—

1. As an improved article of manufacture, two members so formed and shaped as when combined to simulate a fowl's egg, said members being formed with an internal cavity and a filling aperture leading to said cavity, means for stoppering said filling aperture, and a wick device mounted between said members and extending to the surface thereof, together with means for securing said members together.

2. A sanitary nest egg, comprising a hollow body simulating in shape and size an egg, said body being formed of a plurality of members, wick devices mounted between said members and extending from the cavity thereof to the surface, a filling aperture leading to the cavity of said body, and means for closing said aperture.

3. A sanitary nest egg, comprising mating members together simulating in size and shape an egg, said members being formed with communicating cavities, a filling aperture leading to said cavities and provided with closing means, a wick device mounted between said members and extending from the cavities to the surface of the device, and means for securing said members together.

Signed at Lynnville, in the county of Jasper and State of Iowa, this 27th day of August, 1919.

LOUIS CLIFFORD BOUMA.